(12) United States Patent
Hermes et al.

(10) Patent No.: US 8,100,179 B2
(45) Date of Patent: Jan. 24, 2012

(54) PRODUCTION AND DELIVERY OF A FLUID MIXTURE TO AN ANNULAR VOLUME OF A WELLBORE

(75) Inventors: Robert E. Hermes, Los Alamos, NM (US); Ronald Gene Bland, Houston, TX (US); Ron Lee Foley, Magnolia, TX (US); James B. Bloys, Katy, TX (US); Manuel E. Gonzalez, Kingwood, NM (US); John M. Daniel, Germantown, TN (US); Ian M. Robinson, Guisborough (GB); Robert B. Carpenter, Tomball, TX (US)

(73) Assignees: Chevron U.S.A. Inc., San Ramon, CA (US); Los Alamos National Security, LLC, Los Alamos, NM (US); Baker Hughes Incorporated, Houston, TX (US); Lucite International, Inc., Cordova, TN (US)

( * ) Notice: Subject to any disclaimer, the term of this patent is extended or adjusted under 35 U.S.C. 154(b) by 240 days.

(21) Appl. No.: 12/388,994

(22) Filed: Feb. 19, 2009

(65) Prior Publication Data
US 2009/0205828 A1    Aug. 20, 2009

Related U.S. Application Data

(60) Provisional application No. 61/064,147, filed on Feb. 19, 2008.

(51) Int. Cl.
*E21B 33/13* (2006.01)
*E21B 33/14* (2006.01)

(52) U.S. Cl. ........ 166/288; 166/294; 166/295; 166/300; 166/371; 507/219; 507/269; 507/904

(58) Field of Classification Search .................. None
See application file for complete search history.

(56) References Cited

U.S. PATENT DOCUMENTS

| | | | | |
|---|---|---|---|---|
| 3,087,544 | A * | 4/1963 | Forsman | 166/295 |
| 4,402,633 | A * | 9/1983 | Self | 405/259.6 |
| 5,866,516 | A | 2/1999 | Costin | |
| 5,960,877 | A * | 10/1999 | Funkhouser et al. | 166/270 |
| 6,082,456 | A * | 7/2000 | Dahl-Jorgensen et al. | 166/295 |
| 7,066,284 | B2 * | 6/2006 | Wylie et al. | 175/65 |
| 7,343,974 | B2 * | 3/2008 | Cowan | 166/295 |
| 7,441,599 | B2 * | 10/2008 | Hermes et al. | 166/288 |
| 7,510,005 | B2 * | 3/2009 | Coates et al. | 166/288 |
| 7,696,133 | B2 * | 4/2010 | Cowan | 507/224 |

(Continued)

OTHER PUBLICATIONS

Creel, Prentice and Crook, Ron, "Gels, monomer solutions fix pinhole casing leaks", *Oil & Gas Journal*, 95 (41) pp. 44-46 (1997).

(Continued)

*Primary Examiner* — George Suchfield
(74) *Attorney, Agent, or Firm* — Merchant & Gould

(57) ABSTRACT

The methods described herein generally relate to preparing and delivering a fluid mixture to a confined volume, specifically an annular volume located between two concentrically oriented casing strings within a hydrocarbon fluid producing well. The fluid mixtures disclosed herein are useful in controlling pressure in localized volumes. The fluid mixtures comprise at least one polymerizable monomer and at least one inhibitor. The processes and methods disclosed herein allow the fluid mixture to be stored, shipped and/or injected into localized volumes, for example, an annular volume defined by concentric well casing strings.

27 Claims, 7 Drawing Sheets

U.S. PATENT DOCUMENTS

| | | | |
|---|---|---|---|
| 2005/0269080 A1* | 12/2005 | Cowan | 166/250.14 |
| 2006/0276348 A1* | 12/2006 | Cowan | 507/224 |
| 2007/0114033 A1* | 5/2007 | Hermes et al. | 166/295 |
| 2007/0114034 A1* | 5/2007 | Coates et al. | 166/295 |

OTHER PUBLICATIONS

Cauffman, Tim, The Effects Polymerization Inhibitors Have on Acrylate Monomers and Formulations, Sartomer Company, Inc., Exton, PA. pp. 3-7 (2005).

Bloys, B., et al., "Trapped Annular Pressure Mitigation—A Spacer Fluid that Shrinks", SPE/IADE 104698, Drilling Conference, Amsterdam, The Netherlands (2007).

Bloys, B., "Trapped Annular Pressure Mitigation: A Spacer that Shrinks", Power Point presentation at Deepwater Technical Symposium, Aug. 1-17, 2007, New Orleans, LA.

Bloys, B., et al., Trapped Annular Pressure Mitigation—A Spacer that Shrinks — Power Point Presentation summarizing SPE 104698.

Bloys, B.J., et al., "Trapped annular pressure mitigation: A spacer fluid that shrinks", www.WorldOil.com, vol. 229, No. 1, Jan. 2008.

International Search Report from PCT/US2009/034538 filed Feb. 19, 2009, mailed Mar. 4, 2011.

* cited by examiner

PRODUCTION AND DELIVERY OF A FLUID MIXTURE TO AN ANNULAR VOLUME OF A WELLBORE

CROSS-REFERENCE TO RELATED APPLICATIONS

The present application claims priority to U.S. Provisional Application Ser. No. 61/064,147, filed Feb. 19, 2008, which is incorporated herein by reference in its entirety. The present application also incorporates by reference the entire disclosures of pending U.S. patent application Ser. No. 11/282,424, filed Nov. 18, 2005 and U.S. patent application Ser. No. 12/004,416, filed Dec. 21, 2007 which is a continuation of U.S. patent application Ser. No. 11/593,608, filed on Nov. 7, 2006, now abandoned.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF ART

The methods described herein generally relate to preparing and delivering a fluid mixture to a confined volume, specifically an annular volume located between two concentrically oriented casing strings within a hydrocarbon fluid producing well.

BACKGROUND

During the process of drilling a wellbore, such as an oil well, individual lengths of relatively large diameter metal tubulars are typically secured together to form a casing string or liner that is positioned within each section of the wellbore. Each of the casing strings may be hung from a wellhead installation near the surface. Alternatively, some of the casing strings may be in the form of liner strings that extend from near the setting depth of a previous section of casing. In this case, the liner string will be suspended from the previous section of casing on a liner hanger. The casing strings are usually comprised of a number of joints or segments, each being on the order of forty feet long, connected to one another by threaded connections or other connection means. These connections are typically metal pipes, but may also be non-metal materials such as composite tubing. This casing string is used to increase the integrity of the wellbore by preventing the wall of the hole from caving in. In addition, the casing string prevents movement of fluids from one formation to another formation through which the wellbore passes.

Conventionally, each section of the casing string is cemented within the wellbore before the next section of the wellbore is drilled. Accordingly, each subsequent section of the wellbore must have a diameter that is less than the previous section. For example, a first section of the wellbore may receive a surface (or conductor) casing string having a 20-inch diameter. The next several sections of the wellbore may receive intermediate (or protection) casing strings having 16-inch, 13⅜-inch and 9⅝-inch diameters, respectively. The final sections of the wellbore may receive production casing strings having 7-inch and 4½-inch diameters, respectively. When the cementing operation is completed and the cement sets, there is a column of cement in the annulus described by the outside surface of each casing string.

Subterranean zones penetrated by well bores are commonly sealed by hydraulic cement compositions. In this application, pipe strings such as casings and liners are cemented in well bores using hydraulic cement compositions. In performing these primary cementing operations, a hydraulic cement composition is pumped into the annular space described by the walls of a well bore and the exterior surfaces of a pipe string disposed therein. The cement composition is permitted to set in the annular space to form an annular sheath of hardened substantially impermeable cement which supports and positions the pipe string in the well bore and seals the exterior surfaces of the pipe string to the walls of the well bore. Hydraulic cement compositions are also utilized in a variety of other cementing operations, such as sealing highly permeable zones or fractures in subterranean zones, plugging cracks or holes in pipe strings and the like.

Casing assemblies comprising more than one casing string describe one or more annular volumes between adjacent concentric casing strings within the wellbore. Normally, each annular volume is filled, at least to some extent, with the fluid which is present in the wellbore when the casing string is installed. In a deep well, the quantities of fluid within the annular volume (i.e., the annular fluid) may be significant. Each annulus 1 inch thick by 5000 feet long would contain roughly 50,000 gallons, depending on the diameter of the casing string.

In oil and gas wells it is not uncommon that a section of formation must be isolated from the rest of the well. This is typically achieved by bringing the top of the cement column from the subsequent string up inside the annulus above the previous casing shoe. While this isolates the formation, bringing the cement up inside the casing shoe effectively blocks the safety valve provided by nature's fracture gradient. Instead of leaking off at the shoe, any pressure build up will be exerted on the casing, unless it can be bled off at the surface. Most land wells and some offshore platform wells are equipped with wellheads that provide access to every casing annulus and an observed pressure increase can be quickly bled off. On the other hand, most subsea wellhead installations do not provide access to the casing annuli and a sealed annulus may be created. Because the annulus is sealed, the internal pressure can increase significantly in reaction to an increase in temperature.

The fluids in the annular volume during installation of the casing strings will generally be at or near the ambient temperature of the seafloor. When the annular fluid is heated, it expands and a substantial pressure increase may result. This condition is commonly present in all producing wells, but is most evident in deep water wells. Deep water wells are likely to be vulnerable to annular pressure build up because of the cold temperature of the displaced fluid, in contrast to elevated temperature of the production fluid during production. The temperature of the fluid in the annular volume when it is sealed will generally be the ambient temperature, which may be in the range of from 0° F. to 100° F. (for example 34° F.), with the lower temperatures occurring most frequently in subsea wells with a considerable depth of water above the well. During production from the reservoir, produced fluids pass through the production tubing at significantly higher temperatures. Temperatures in the range of 50° F. to 300° F. are expected, and temperatures in the range of 125° F. to 250° F. are frequently encountered.

The relatively high temperature of the produced fluids increases the temperature of the annular fluid between the casing strings, and increases the pressure against each of the casing strings. Conventional liquids which are used in the annular volume expand with temperature at constant pressure; in the constant volume of the annular space, the increased fluid temperature results in significant pressure increases. Aqueous fluids, which are substantially incompressible, could increase in volume by upwards of 5% during the temperature change from ambient conditions to production conditions at constant pressure. At constant volume, this increase in temperature may result in pressure increases up to on the order of 10,000 psig. The increased pressure significantly increases the chances that the casing string fails, with catastrophic consequences to the operation of the well.

The annular pressure build up (APB) problem is well known in the petroleum drilling/recovery industry. See: B. Moe and P. Erpelding, "Annular pressure buildup: What it is and what to do about it," Deepwater Technology, p. 21-23, August (2000), and P. Oudeman and M. Kerem, "Transient behavior of annular pressure buildup in HP/HT wells," J. of Petroleum Technology, v. 18, no. 3, p. 58-67 (2005). Several potential solutions have been previously reported: A. injection of nitrogen-foamed cement spacers as described in R. F. Vargo, Jr., et. al., "Practical and Successful Prevention of Annular Pressure Buildup on the Marlin Project," Proceedings—SPE Annual Technical Conference and Exhibition, p. 1235-1244, (2002), B. vacuum insulated tubing as described in J. H. Azzola, et. al., "Application of Vacuum Insulated Tubing to Mitigate Annular Pressure Buildup," Proceedings—SPE Annual Technical Conference and Exhibition, p. 1899-1905 (2004), C. crushable foam spacer as described in C. P. Leach and A. J. Adams, "A New Method for the Relief of Annular Heat-up Pressure," in proceedings,—SPE Annual Technical Conference and Exhibition, p. 819-826, (1993), D. cement shortfall, full-height cementation, preferred leak path or bleed port, enhanced casing (stronger), and use of compressible fluids as described in R. Williamson et. al., "Control of Contained-Annulus Fluid Pressure Buildup," in proceedings, SPE/IADC Drilling Conference paper Number 79875 (2003), and E. use of a burst disk assembly, as described by J. Staudt in U.S. Pat. No. 6,457,528 (2002) and U.S. Pat. No. 6,675,898 (2004). These prior art examples, although potentially useful, do not provide full protection against the APB problem due to either difficulties in implementation or prohibitory costs, or both.

SUMMARY

A process for delivering a mixture to a confined volume is disclosed herein. The process comprises (a) forming a mixture of at least one polymerizable monomer and at least one inhibitor in a water-based fluid; (b) transporting the mixture to a second location; (c) delivering at least a portion of the mixture to a localized volume at the second location; and (d) sealing the localized volume to produce a confined volume containing at least a portion of the mixture. The polymerizable monomer and the inhibitor are present in the mixture in an amount determined from the following: (i) time elapsed between forming the mixture in step (a) and sealing the localized volume in step (d), (ii) a projected temperature conditions during transportation in step (b), and expected pressure change in the confined volume after sealing the mixture within the confined volume.

Additionally disclosed is a process for controlling pressure buildup within an annular volume located between two casing strings within a wellbore. The process comprises (a) forming a mixture of at least one polymerizable monomer and at least one inhibitor; (b) transporting the mixture to a second location; (c) optionally mixing at least one initiator into the mixture; (d) filling at least a portion of the annular volume with the mixture; (e) sealing the annular volume; and (f) heating the mixture within the sealed annular volume such that the polymerizable monomer polymerizes with a decrease in pressure within the sealed annular volume.

A process for delivering a mixture to an encapsulated volume is also disclosed. The method comprises (a) forming a first mixture of at least one polymerizable monomer and at least one inhibitor in a water-based fluid at a first location; (b) transporting the first mixture to a second location; (c) adding at least one initiator to the first mixture at the second location to form a second mixture; (d) delivering at least a portion of the second mixture to a localized volume; and (e) sealing the localized volume to produce an encapsulated volume filled with at least a portion of the second mixture.

Further disclosed is a process for delivering a mixture to an annular volume within a well-bore comprising: (a) forming a first mixture of at least one monomer and at least one inhibitor in a water-based fluid at a first location; b) transporting the first mixture to a second location; c) adding at least one initiator to the first mixture at the second location to form a second mixture; d) delivering at least a portion of the second mixture to an annular volume located between two concentric casing strings within a well-bore; and e) sealing the annular volume to produce an encapsulated volume filled with at least a portion of the second mixture.

Figure 1:
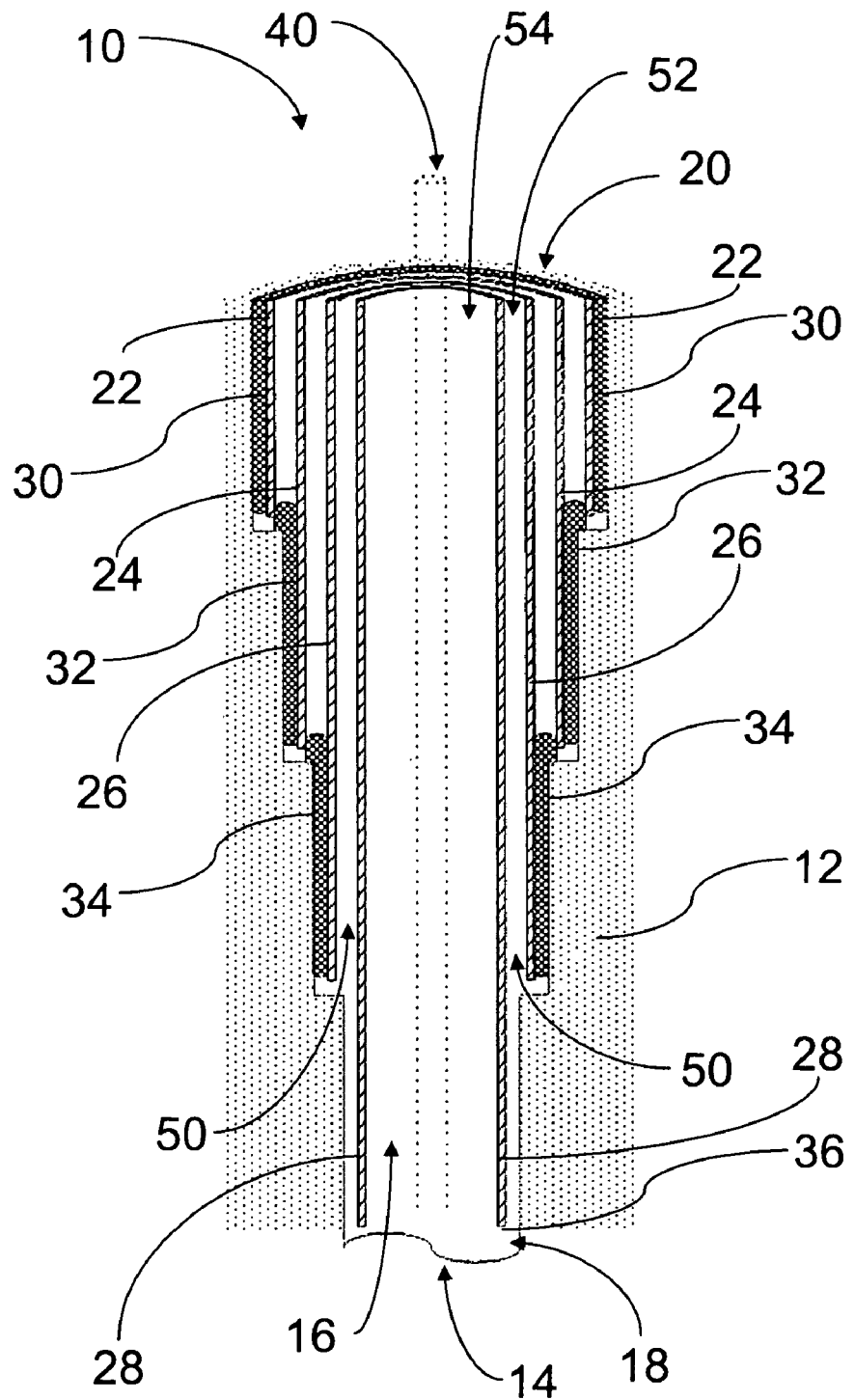
FIG. 1 illustrates an exemplary well comprising a localized volume set to receive a fluid mixture.

Corresponding reference characters indicate corresponding like elements throughout multiple views. Although the figures represent embodiments of the present invention, the figures are not necessarily to scale and certain features may be exaggerated in order to better illustrate and explain the present invention.

DETAILED DESCRIPTION

Among other factors, it has been discovered that processes and methods disclosed herein postpone polymerization of the polymerizable monomers in the fluid mixture for a significant period of time. During such postponement, the fluid mixture can be stored, shipped and/or injected into localized volumes, for example, an annular volume defined by concentric well casing strings.

The fluid mixtures disclosed herein are useful in controlling pressure in localized volumes. As such, the fluid mixtures can be used to replace at least a portion of a first fluid within the localized volume with the fluid mixtures as disclosed herein. The localized volume is sealed to produce a confined volume.

The fluid mixture as disclosed herein comprises at least one polymerizable monomer and at least one initiator in a fluid. This fluid may be a water-based fluid, oil-based fluid, or synthetic-based fluid. The polymerizable monomer within the fluid mixture polymerizes with a decrease in pressure within the confined volume. The polymerizable monomer may polymerize with an increase in temperature or the polymerizable monomer may polymerize over time with or without the use of an initiator. The monomer polymerizes with a decrease in pressure within the confined volume such that the final pressure will be less than had the confined volume contained only the first fluid. This final pressure may be greater than, equal to, or less than the initial pressure when the fluid mixture is delivered into the confined volume; however, it is less than had the confined volume contained only the first fluid.

Definitions

As used herein, the term "methyl methacrylate (MMA) monomers" refers to methyl 2-methyl-2-propenoate monomers represented by the following formula.

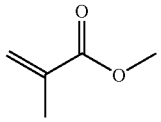

MMA monomers polymerize to form polymethyl methacrylate (PMMA), which is represented by the formula:

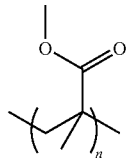

where n≧2.

"Inhibitor" means a chemical compound that delays monomers from polymerizing to form a polymer.

"Weighting agent" refers to a chemical compound that increases the density of a substance to which it is added. Suitable examples include brines (e.g. KCl, NaCl), barite, hematite, calcium carbonate, siderite, and ilmenite.

"Polymerization initiator" refers to a chemical compound that begins polymerization of monomers to form a polymer.

"Optional" or "optionally" means that the subsequently described event, circumstance or component may, but need not, be present. Thus, the description includes instances where the event, circumstance, or component is present and instances in which it is not present.

"Spacer fluid" means any liquid used to physically separate one special-purpose liquid from another.

A process for delivering a mixture to a confined volume, as described herein, comprises forming a mixture of at least one polymerizable monomer and at least one inhibitor in a water-based fluid. The fluid may also optionally comprise at least one initiator. Accordingly, in one embodiment the fluid mixture includes polymerizable monomers and inhibitor, and in another embodiment, the fluid mixture includes polymerizable monomers, inhibitor, and initiator.

Once prepared, this fluid mixture can be injected into an annular volume located between a casing or casing string and a wellbore wall and left for an extended period of time. The polymerizable monomers in the fluid mixture may not polymerize to a significant degree for a period of time. After this period has elapsed, the polymerizable monomers polymerize resulting in a decrease in pressure within the annular volume. The relative amounts of polymerizable monomer and initiator are selected in order to postpone polymerization of the monomers for a desired period of time and to achieve the decrease in pressure desired within the annular volume. Analysis can be performed using any suitable analytical technique which will allow the determination of the monomer and/or inhibitor concentration prior to use.

The amount of monomers and inhibitor can be calculated by one of skill in the art using the following parameters: (1) time elapsed between forming the mixture and sealing the localized volume; a projected temperature conditions during transportation of the mixture; and expected pressure change in the confined volume after sealing the mixture within the confined volume. The expected pressure change is at least in part based upon the projected temperature conditions of the wellbore. The projected temperature conditions are based on an estimation of the temperature conditions that will be experienced by the fluid mixture. These temperature conditions include the temperature when the mixture is prepared, the temperature conditions during transportation, and the temperatures encountered by the mixture after it is injected into the confined volume.

The polymerizable monomers can be present in the fluid mixture in an amount between about 0.5 weight percent and about 50 weight percent. The polymerizable monomers can be water soluble monomers and oil soluble monomers. Both a water soluble monomer and a water insoluble monomer, when added to the annular volume, can polymerize, with an accompanying decrease in volume (and associated decrease in pressure within the annular volume). Such a decrease in volume would, in the confined volume of the sealed annulus, result in a decrease in pressure, within the confined volume, relative to a similar system without polymerization of the particular monomers of the present invention.

The polymerizable monomer can be selected from acrylates, methylacrylates, styrenics, N-vinyl amides, acrylamides, methacrylamides, and vinyl urethanes. Non-limiting examples of styrenics include vinyl benezene and derivatives. Non-limiting examples of acrylic monomers include acrylamide, methacrylamide, their derivatives, acrylic acid, methacrylic acid, their salts, acid salts and quaternary salts of N,N-dialkylaminoalkyl acrylates or methacrylates, acidic salts of diallylamine, diallyldialkyl ammonium salts, sulfoalkyl acrylates or methacrylates, acrylamidealkyl sulfonic acids and their salts, and the like. More preferably, the acrylic monomers include methyl acrylate, methyl methacrylate, and mixtures thereof Non-limiting examples of other vinyl monomers that could be practical for this in-situ polymerization process include other acrylic esters, methacrylic esters, butadiene, styrene, vinyl chloride, N-vinylpyrrolidone, N-vinylcaprolactam, or other such oil and/or water soluble monomers.

With the polymerization of the monomers in the fluid mixture, a reduction in volume results from the polymerization process. Such a decrease in volume would, in the confined volume, result in a decrease in pressure, within the confined volume, relative to a similar system without polymerizable monomers. This decrease in pressure assists in controlling the pressure within the confined volume.

The fluid mixture as disclosed herein further comprises an inhibitor. The polymerization inhibitor can be present in the fluid mixture in an amount between about 1 ppm and about 10,000 ppm. The inhibitor can be oil or water soluble. In one embodiment the inhibitor is a high temperature inhibitor; the inhibitors can be stable up to 100° F. for several hours. In one embodiment the inhibitor is oil soluble.

Inhibitors are well known to those of skill in the art. Inhibitors are commercially available. Suitable inhibitors trap free radicals. Such inhibitors include those needing oxygen to provide inhibition, such as phenolic compounds hydroquinone (HQ), hydroquinone monomethyl ether (MEHQ), and the like. Other inhibitors which do not need oxygen for the inhibitory effect include phenothiazine (PTZ) and derivatives thereof, 2,2,6,6-tetramethylpiperidin-1-oxyl free radical (TEMPO), 4-hydroxy-2,2,6,6-tetramethylpiperidin-1-oxyl free radical (4-hydroxyTEMPO), and derivatives thereof, N-nitrosophenylhydroxylamine ammonium or aluminum salts; and N,N-diethylhydroxylamine. Mixtures of inhibitors can be used.

The fluid mixture comprising polymerizable monomers and inhibitor is prepared at a first location and then transported to a second location. This first location may be remote from the first location, for example 100 miles or more. The first location may be on-shore or off-shore. The second location is located at the site of the confined volume to which the fluid mixture is to be delivered. The second location may be on-shore or off-shore. In one embodiment, the first location is on-shore and the second location is off-shore. The off-shore location can be an off-shore platform, such as a jack-up rig, semi-submersible rig, or free-floating drill ship, or any other apparatus or ship which is typically used for drilling off-shore wells.

A sizeable period of time may elapse after preparation of the fluid mixture, during transportation from the first location to the second location and until the fluid mixture is delivered to the localized volume. For example, at least five weeks may elapse.

The fluid mixture may be transported by conventional means well known to those of skill in the art, including tanker vehicles over land and tanker ships over water to off-shore locations.

The fluid mixture may optionally comprise one or more initiators. The initiator can be oil or water soluble. In one embodiment the initiator is water soluble. In one embodiment the initiator is a high temperature initiator. In an embodiment the initiator is oil soluble. Initiators are well known to those of skill in the art. Initiators are commercially available. Suitable polymerization initiators include free radical initiators. Such initiators include azo-compounds, organic peroxides, and inorganic peroxides (e.g. potassium persulfate). Azo-initiators can be suitable as high temperature initiators.

An azo-type initiator produces nitrogen gas as a by-product during the polymerization process. The resulting gas phase component which is generated in the confined annular volume, being a compressible fluid, can contribute to the control of the pressure within the confined annular volume as the annular fluid is being heated by the product fluid passing through the production tubing. A peroxide initiator may also be used, depending on the temperature and chemical constraints of the product fluid. Alternatively, a redox initiator system such as ammonium persulfate and the activator N,N, N'N'-tetramethylethylenediamine, or potassium persulfate and the activator ferrous sulfate/sodium bisulfite could also be used if encapsulated as mentioned above to control the timing of when the polymerization occurs.

When the fluid mixture comprises initiator, the initiator may be added at the second location prior to the fluid mixture being delivered to the confined volume. The initiator may be added just prior to the fluid mixture being delivered to the confined volume or the initiator may be added and then the fluid mixture may be stored for some period before being delivered to the confined volume. This period may be up to several hours, for example 1 to 6 hours.

The amount of initiator added to the mixture can be determined from the following parameters: (1) time desired between adding the initiator and beginning polymerization of the polymerizable monomer; a projected temperature profile of the mixture after addition of the initiator; reaction rate of initiator with the polymerizable monomer; and reaction rate of the inhibitor with the initiator. The initiator can be present in the fluid mixture in an amount between about 0.001 weight percent and about 5 weight percent of the mixture.

The method of preparing a trapped annular pressure fluid, as described herein, may further include mixing at least one weighting agent with the polymerizable monomers and the inhibitor. If the weighting agent is used, it increases the density of the fluid mixture. The density increases as the amount of weighting agent increases and should be adjusted so that it falls within a range suitable for pumping the fluid mixture within the aforementioned annular volume. Suitable weighting agents are well known to those of skill in the art and include, for example, brines, barite, hematite, calcium carbonate, siderite, ilmenite, and mixtures thereof. According to one embodiment of the method as described herein, the at least one weighting agent is barite or barium sulfate ($BaSO_4$), which is conventionally used to increase the density of oil well drilling fluid.

As previously described, the fluid mixture can be prepared by either one mixing step or two, separate mixing steps, wherein the second mixing step occurs some time after the initial mixing step with the initial mixing step occurring at the first location and the second mixing step occurring at the second location remote from the first location. The initial mixing step can involve mixing the polymerizable monomers, the at least one inhibitor, and optionally at least one weighting agent. The subsequently mixing step can involve mixing the at least one initiator, mixing additional polymerizable monomer, and mixing additional inhibitor.

The resulting mixture can cover the range of true emulsions and suspensions. The droplets can either be in the oil continuous phase (i.e., totally solubilized within the oil or synthetic-based fluid) or emulsified within the water phase (droplets between 0.1 and 200 microns), or in the case of water soluble monomers, dissolved in the water phase of any water based drilling/spacer fluids. In one embodiment the polymerizable monomers are present in the fluid as droplets and the inhibitor is oil soluble and the initiator is water soluble.

In one embodiment the fluid mixture is an emulsion of polymerizable monomers and oil soluble inhibitor. Emulsification ensures that the monomers and inhibitor are in good contact with each other. The monomers and inhibitor may be mixed such that droplets comprise the monomers and these droplets have a diameter between about 10 µm and about 200 µm.

The mixture of the polymerizable monomers with the inhibitors helps to prevent and/or delay premature polymerization. After the inhibitor is expended, the monomers will polymerize, particularly when exposed to favorable conditions, including increased temperature and optionally initiator. The monomers will polymerize on their own. Accordingly, including initiator in the fluid mixture to facilitate polymerization is optional.

Upon the addition of initiator, the initiator will react with polymerization inhibitor. Excess initiator in the fluid mixture will assist in triggering polymerization of the monomers.

The at least one initiator can be water soluble or water-insoluble. Possible polymerization initiators include azo-type initiators, peroxide initiators, an ammonium persulfate/N,N,N',N'-tetramethylethylene diamine redox initiator system, and a potassium persulfate/ferrous sulfate/sodium bisulfate initiator system. Azo-type initiators are desirable because they produce nitrogen gas as a by-product. Since nitrogen gas is a compressible fluid, it can assist contribute to pressure reduction within the annular volume.

One or more additives can also be mixed into the fluid mixture comprising monomers, inhibitor, optional initiator, and optional weighting agent. Exemplary additives include surfactants, pH buffers, biopolymers, emulsifiers, defoamers, dispersants, and anti-static agents. Addition of a surfactant stabilizes an emulsion. Addition of a pH buffer counteracts any pH change that results when any cement remains within the annular volume after the trapped annular pressure fluid is injected to the annular volume. Addition of a biopolymer affects the viscosity of the fluid mixture. Addition of an anti-static agent can prevent build up of static charge and sparking. The antistatic agent preferably comprises hydrophilic and hydrophobic groups.

In practice, the fluid mixture can be delivered into an annular volume defined by two, concentrically arranged casing strings. Therein, the fluid displaces at least a portion of fluid already contained within such annular space. The annular space is generally filled with fluid present when the innermost casing string is installed. Conventional fluids which may initially be present in the annular volume include a drilling fluid or a completion fluid, depending on the circumstances of the drilling operation. In any event, this fluid is an incompressible fluid.

In order to understand implementation of the trapped annular pressure fluid to control pressure within the annular volume, a discussion of well construction using the trapped annular pressure fluid is instructive.

It should be appreciated the number of casing strings and the depth of the well varies from well to well. For simplicity, the fluid initially present in the annular volumes defined by the various casing strings is called drilling fluid.

A well is formed by drilling into earth with a drill rig to provide a hole, known as a wellbore. As the wellbore is drilled, it is necessary to insert a series of casing strings into the wellbore to prevent the sides of the wellbore from collapsing inwardly into the wellbore. Initially, the wellbore is drilled to a first depth and a casing string is inserted and sealed against the wellbore wall by a cement plug. Next, the wellbore is drilled deeper and with a narrower diameter to a second depth and a casing string is inserted creating an annular volume between the casing strings. The annular volume is in fluid communication with the body of the wellbore at the second depth. At this point, the annular volume is filled with drilling fluid and the trapped annular pressure fluid (the fluid mixture as disclosed herein) must be introduced into the annular volume in order to replace at least a portion of the drilling fluid.

This can be accomplished in one of two manners. The trapped annular pressure fluid can be introduced into the body of the wellbore such that it passes downwardly through the body in relatively pure form in the form of a plug or pill, enters the annular volume at the second depth, and passes upwardly through the annular volume driving the drilling fluid originally in the annular volume ahead of the trapped annular pressure fluid and out of the annular volume. Alternatively, the trapped annular pressure fluid can be introduced into the top of the annular volume. Introducing fluid through the upper end of the annular volume is commonly referred to as "bull-heading." After a sufficient amount of the trapped annular pressure fluid has been added to the annular volume, the annular volume is sealed at its lower end by a concrete plug, and at its upper end by a casing annular plug.

The wellbore is drilled even deeper with an even narrower diameter to a third depth and a casing string is inserted creating an annular volume between the casing strings. The annular volume is in fluid communication with the body of the wellbore at the third depth. At this point, the annular volume is filled with drilling fluid and the trapped annular pressure fluid (the fluid mixture as disclosed herein) must be introduced into the annular volume in order to replace at least a portion of the drilling fluid therein. As with previous annular volume, this can occur in one of two ways as described above. After a sufficient amount of the trapped annular pressure fluid has been added to the annular volume, the annular volume is sealed at its lower end by a concrete plug and at its upper end by a casing annular plug.

Finally, the wellbore is drilled deeper with a narrower diameter to the wellbore terminus. The terminus may be a temporary terminus because the wellbore may be extended further at a later time. A casing string, which is the final member of the casing assembly, is inserted into the wellbore creating an annular volume between the casing strings. The volume of the wellbore itself is then defined by the cylindrically shaped space within the casing string. During well production, production fluid (e.g. oil, natural gas) flows through this wellbore volume. The annular volume is in fluid communication with the wellbore volume at the terminus. At this point, the annular volume is filled with drilling fluid and the trapped annular pressure fluid must be introduced into the annular volume in order to replace at least a portion of the drilling fluid. The trapped annular pressure fluid can be introduced into the wellbore volume such that it passes downward through the volume in relatively pure form in the form of a plug or pill, enters the annular volume at the terminus, and passes upwardly through the annular volume driving the drilling fluid originally in the annular volume ahead of the trapped annular pressure fluid and out of the annular volume. As an alternative, the trapped annular pressure fluid can be introduced into the top of the annular volume. After a sufficient amount of trapped annular pressure fluid has been added to the annular volume, the annular volume is sealed at its lower end by a concrete plug and at its upper end by a casing annular plug.

The amount of trapped annular pressure fluid supplied to the annular volumes is a matter of engineering choice, depending on the amount of pressure which can be tolerated inside the annular volumes once they are sealed. This amount is further influenced by, for example, the size of the well system, the temperature of the trapped annular pressure fluid when it is supplied to the annular volume, the temperature of the trapped annular pressure fluid in the annular volume, the temperature of the production fluids (e.g. oil, natural gas) that will be produced in the well, projected temperature of the trapped annular pressure fluids within the annular volume during production, design and specifications of the casing string, and the like.

The temperatures within the annular volumes prior to production are significantly lower than the temperatures within the annular volumes during production. If the well is onshore, generally the temperatures within the annular volumes are between approximately 0° F. and 150° F. But if the well is an offshore, subsea well, the temperatures within the annular volumes can be less than 60° F., or less than 40° F., for example, between approximately 25° F. and 35° F.

During production, hydrocarbon production fluids flow through the wellbore body. This hydrocarbon production fluid can have temperatures in the range of approximately 50° F. to 400° F. Most frequently, temperatures in the range of approximately 125° F. to 250° F. are encountered. Heat from this hotter, hydrocarbon production fluids transfers to the fluid, including the trapped annular pressure fluid, within the annular volumes thereby raising the temperatures within the annular volumes. Since each annular volume is a confined area, pressure within each annular volume increases with increase in temperature. If the temperatures encountered are high enough, the corresponding pressure can deform or fracture the casing strings defining the annular volume. But if pressure is eventually reduced by some means so that the pressure cannot climb to this "deforming" or "fracture" pressure, the casing strings will remain intact and the well will continue to function properly.

The trapped annular pressure fluid as described herein reduces pressure within the annular volume. The polymerizable monomers occupy a considerably larger volume, up to 20% more volume, than their counterpart solid polymer. See, for example, "Acrylic and Methacrylic Ester Polymers," in *Encyclopedia of Polymer Science and Engineering,* 2nd Edition, J. Kroschwitz, ed., John Wiley & Sons, Inc., Volume 1, Table 20, p. 266 (1985) and D. A. Tildbrook, et al., "Prediction of Polymerization Shrinkage Using Molecular Modeling," J. Poly. Sci.; Part: B Polymer Physics, 41, 528-548 (2003). Thus, polymerization of the monomers reduces pressure within the annular volume.

The temperatures encountered after preparation prior to transportation, during transportation of the fluid mixture, storage after transportation prior to delivery, and in the confined volume after delivery prior to hydrocarbon production, determines in part, the amount of monomer and inhibitor, and optional initiator, added to the mixture and the time at which the monomers polymerize. Accordingly, a time and temperature history until sealing the confined volume is utilized in determining the amount of monomer, inhibitor, and optional initiator. The mixing occurs at relatively low temperatures, for example, between approximately 0° F. and 100° F. During transportation, the mixture may encounter temperatures between approximately 0° F. and 120° F. As indicated above, temperature gradually rises within the annular volume to a relatively high temperature due to heat transfer from the hydrocarbon production fluid. These temperatures affect the reaction rate between the free radicals and inhibitor, free radicals and monomers, and inhibitor and initiator, respectively. Higher temperatures increase these reaction rates and, therefore, decrease the time period until polymerization. The rate of hydrocarbon production can also be adjusted initially to achieve the desired reaction rate and polymerization rate.

Days, weeks, or months may elapse between preparation of the trapped annular pressure fluid (the fluid mixture as disclosed herein) and the desired time of polymerization of the monomers.

In one embodiment, the fluid mixture may be stored and/or transported for at least five weeks. This facilitates shipment of the mixture from a first location (e.g. an on-shore location) to a second location (e.g., an offshore location). The fluid mixture may also be stored at the second location prior to delivery to the localized volume. The fluid mixture may be stored for a period of minutes up to several hours (e.g., 1 to 6 hours). This facilitates use of the fluid mixture as described herein.

The following detailed description should be read with reference to the figures in which like elements in different figures are numbered identically. The figures depict selected embodiments and are not intended to limit the scope of the invention. The embodiments disclosed below are not intended to be exhaustive or to limit the invention to precise forms. Rather, the embodiments are chosen and described so that others skilled in the art may utilize their teachings. Those of skill in the art should, in light of the present disclosure, appreciate that many modifications can be made to the selected embodiments described and still obtain a like or similar result without departing from the spirit and scope of the present invention. It will be understood that embodiments shown in the figures and described below are merely for illustrative purposes, and are not intended to limit the scope of the invention as defined in the claims that follow.

The present invention is generally directed to a process for producing and delivering a fluid mixture to a localized volume, wherein the localized volume is sealed subsequent to delivery of the fluid mixture and thereafter, the fluid mixture will decrease in specific volume as the temperature of the fluid mixture is increased. The fluid mixture includes at least one monomer that may begin to polymerize when exposed to elevated temperatures as compared to ambient conditions. Considering the monomer is typically emulsified within the fluid mixture at a production plant location and then transported to the localized volume, which may take days or even weeks, it is often exposed to elevated temperatures prior to being introduced into the localized volume. For instance, during transport to an offshore rig, it may overheat in a vessel tank while pending delivery. This often causes undesired premature polymerization detracting from the objective of utilizing the fluid mixture. The present invention includes addition of an inhibitor to the fluid mixture to eliminate premature polymerization, as well as, optionally an initiator to counteract the results of the inhibitor once the fluid mixture is encapsulated within the localized volume.

Representatively illustrated in FIG. 1 is an embodiment of the present invention, wherein a localized volume is ready for delivery of a prepared fluid mixture. Wellbore 10 has previously been drilled into terrain 12 using drill string 40, and casing string assembly 20, comprising at least two connected concentric casing (22, 24, 26, 28), has already been installed. The oil rig wellhead installation assembly including supporting means for supporting the drill string 40, for installing the casing string assembly 20, sealing the casing string assembly 20, and for supplying the fluids to the wellbore 10, is not shown. In FIG. 1, casing 22 is the largest diameter casing of casing string assembly 20 and hence was the first to be installed. Subsequent to installation, casing 22 was sealed against the wellbore 10 by a cement plug 30. Wellbore 10 was then drilled deeper and casings 24, 26 were correspondingly installed and sealed at or near one end against the wellbore 10 by cement plugs 32, 34 respectively. In addition to sealing casings to the wellbore, cement plugs may also bond the casings to adjacent concentric casings. Hence in addition to sealing to the wellbore 10, cement plug 32 bonds casing 24 to casing 22 and cement plug 34 bonds casing 26 to casing 24.

Particular attention is now directed to casing 28, which has been installed to extend in close proximity to wellbore terminus 14 such that there is a gap 18 in between wellbore terminus 14 and casing end 36 of casing 28. It is clear that terminus 14 may be temporary, such that the wellbore may be drilled deeper once casing 28 is intact. Alternatively, casing 28 may extend to the final target depth and the wellbore 10 will not be drilled deeper prior to when production commences. A localized annular volume 50, confined by the inside surface of casing 26 and the outside surface of casing 28, is filled with a fluid. Typically this fluid is present within the wellbore volume 16 when casing 28 is installed and may comprise one or more fluids, such as drilling fluid or completion fluid, depending on the circumstances of the drilling operation. Regardless, the properties of the fluid within the annular volume 50 are selected to meet the needs of the wellbore drilling operator and can be considered a standard incompressible fluid such that the density of the fluid essentially remains constant during thermal and pressure fluctuations. Thus, when the fluid is confined to a particular volume a temperature increase of the fluid generates a corresponding pressure increase as the specific volume negligibly changes. Fluid may freely pass in between annular volume 50 and wellbore volume 16 via the gap 18 beneath casing end 36 of casing 28. The opposing end of the annular volume 50, designated by 52, is in fluid communication with wellhead installation assembly (not shown), such that fluids exiting annular volume 50 may be recovered. For instance, drilling fluid or mud might be retrieved and passed through a filter to remove separated rock content such that it may eventually be recycled back to the drill bit for future drilling.

In the process of the invention, a prepared fluid mixture is delivered to annular volume 50. Delivery of the prepared fluid mixture typically occurs in accordance with two generally known methods: (1) The prepared fluid mixture may be introduced to wellbore volume 16 through wellbore opening 54 and pumped downward until reaching wellbore terminus 14, at which point it passes through gap 18 below casing string end 36 of casing string 28 into annular volume 50. The standard incompressible drilling or completions fluid previously occupying annular volume 50 is therefore pushed out through annular volume wellhead opening 52. (2) The prepared fluid mixture is pumped down directly from the top of annular volume 50 through annular volume wellhead opening 52 defined by the exterior of casing string 28 and the interior of casing string 26. The standard incompressible drilling or completions fluid previously occupying the annular volume is therefore pushed back into wellbore volume 16 through gap 18. This process is typically coined "bull-heading" within the petroleum industry's drilling/recovery sector. In the process of the invention, at least a portion of the prepared fluid mixture is supplied to the localized or annular volume. The actual quantity of the prepared fluid mixture delivered may vary depending on a number of well specific factors such as upon well depth and location, the casing string assembly load limitations, localized temperatures and pressures within the well system during drilling and completions, and temperatures and pressures expected within the well system during production. Characteristics of the prepared fluid mixture (e.g., density, composition) may also influence this quantity.

Figure 2:
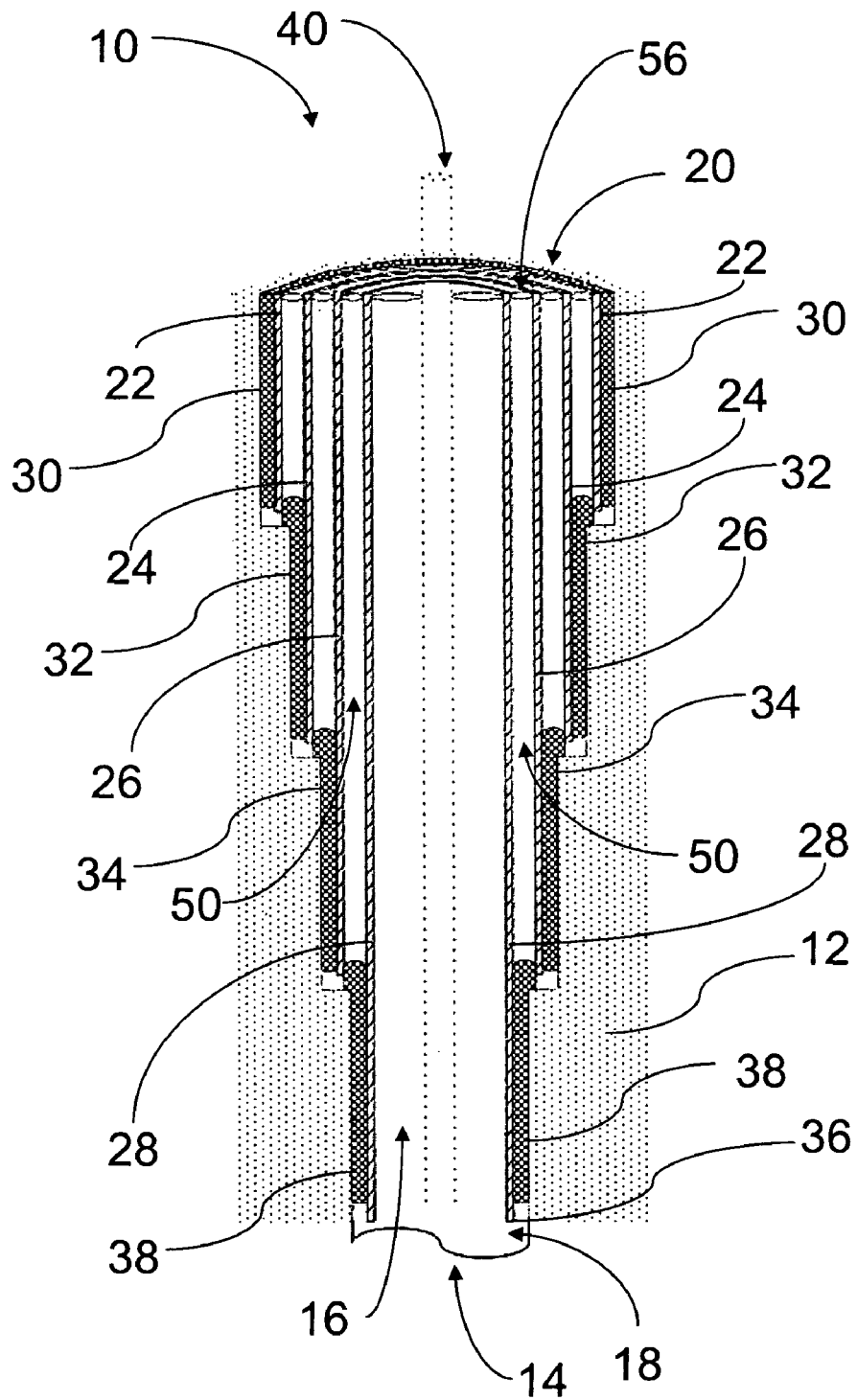
FIG. 2 illustrates the exemplary well comprising a localized volume of FIG. 1 encapsulated or sealed such that it contains a prepared fluid mixture.

Upon sufficient delivery of the prepared fluid mixture to annular volume 50, annular volume 50 is encapsulated as depicted in FIG. 2. Similar to cement plugs 30, 32, 34, a cement plug 38 acts as a binder sealing the exterior of casing 28 to the wellbore wall. Cement plug 38 likewise bonds the exterior of casing 28 to the interior of casing 26 preventing fluid transfer in between the casings. Generally, the wellhead installation assembly (not shown) also includes casing annulus seals 56 for enclosing the wellhead; thus covering casing openings, such as opening 52 (FIG. 1) of annular volume 50, and fully encapsulating annular volume 50. Therefore, the encapsulated volume represented by annular volume 50 now contains and prevents escape of at least a portion of the prepared fluid mixture. The prepared fluid mixture, unlike the drilling or completions fluid, is to be considered a compressible fluid such that the density or inversely proportional specific volume does not remain constant when undergoing temperature or pressure fluctuations. Thus, as the temperature within the wellbore rises during production, the prepared fluid mixture becomes more compact or dense and a reduction in specific volume occurs. This translates to an overall pressure reduction within the annular volume 50 as compared to that of a conventional system wherein the annular volume 50 is filled completely with an incompressible fluid. Likewise, the process shown in FIGS. 1 and 2 may have already occurred for previous annular volumes within the drill string assembly 20, such that the prepared fluid mixture may be present in the sealed annular volumes between previous casings 26 and 24 or casings 24 and 22.

Figure 2A:
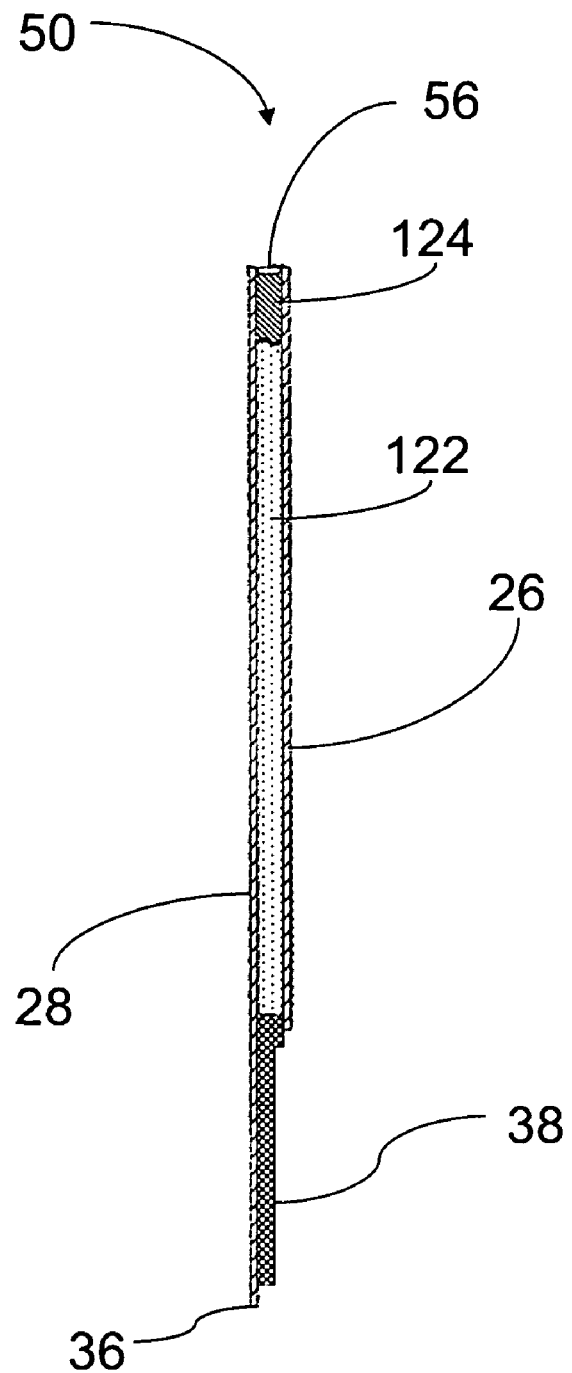
FIG. 2A is a section view of FIG. 2 detailing a fluid arrangement within a sealed annular volume according to the present invention.

In the prior art, for the seal to adhere properly to the wellbore and the casings, a spacer fluid is cycled through directly before delivery of the cement slurry. The spacer fluid generally comprises a chemically treated aqueous solution, often containing a large number of surfactants and additives, that washes the surfaces of the casings and wellbore so that the surfaces may obtain a strong bond with the cement while it sets. The spacer fluid also may help to facilitate ideal hardening conditions for the slurry by inducing a particular flow regime as the slurry is pumped into the annular volume. Furthermore, it may also act as a buffer separating other fluids from the cement slurry while it is hardening so that the cement slurry does not become contaminated. In accordance with the present invention, FIG. 2A shows a section view of FIG. 2 detailing a fluid arrangement within annular volume 50 according to the present invention. The prepared fluid mixture or second mixture 122 is in direct fluid contact with the cement slurry during delivery and remains in contact with the cement plug 38 once the slurry has hardened, as depicted in FIG. 2A. Second mixture 122 may be prepared with a number of additives and surfactants such that it can perform the roles of the previously used spacer fluid. Thus, second mixture 122 may be used to cleanse the spacers and wellbore, assist in pumping conditions of the cement slurry, and act as a buffer interface ensuring the cement slurry does not become contaminated. Examples of the additives and surfactants that may be present within second mixture 122 include accelerators, retarders, dispersants, emulsifiers, defoamers, and pH stabilizers. Other additional special additives may be utilized as well to fulfill a specific role. In some embodiments, fluid 124 positioned adjacent second mixture 122 comprises a drilling or completions fluid used by the drilling practitioner. In these embodiments, annular volume 50 was originally filled completely with fluid 124 before second mixture 122 was pumped into annular volume 50 and a portion of fluid 124 was pushed out of annular volume though opening 52 (FIG. 1). In other embodiments, fluid 124 may comprise a spacer fluid that assists second mixture 122 in cleansing the spacers 26, 28 and wellbore.

Figure 3:
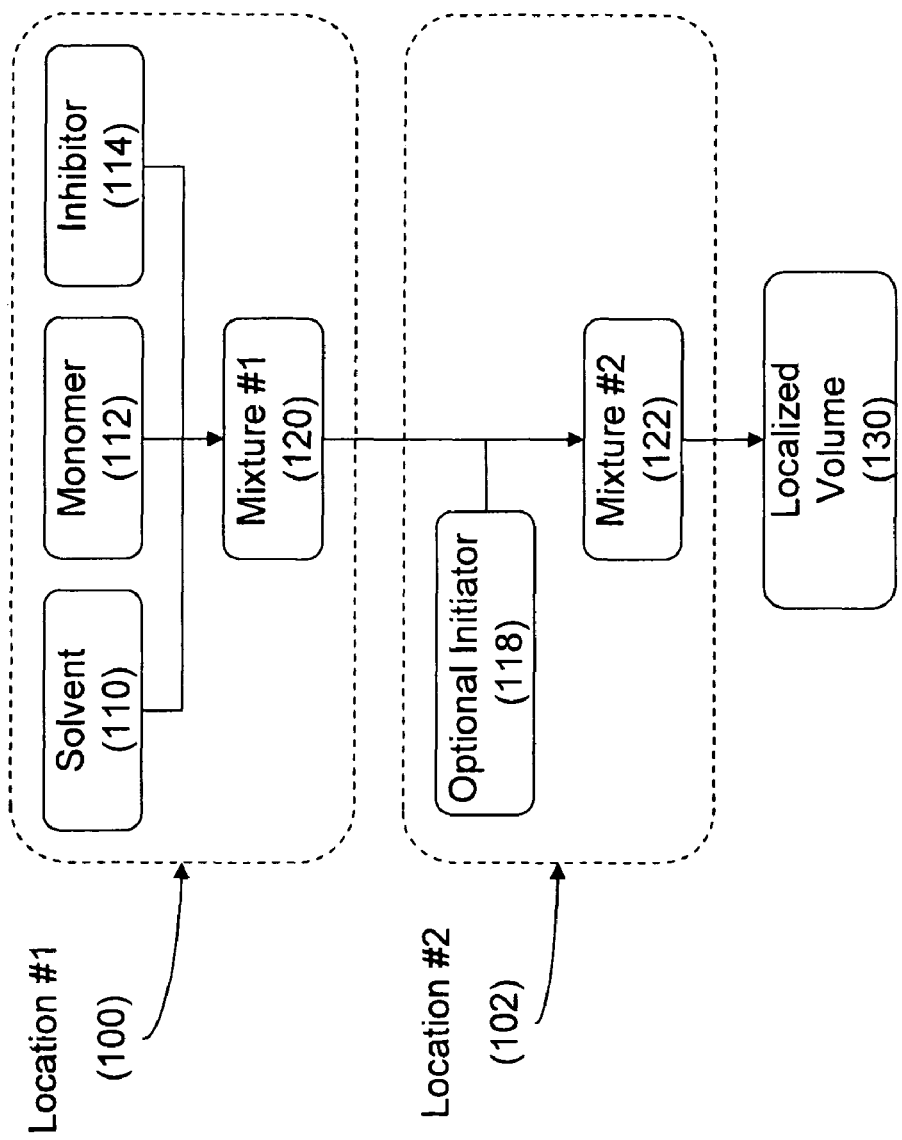
FIG. 3 illustrates a flow process of the present invention for production and delivery of a fluid mixture to a localized volume.

FIG. 3 illustrates a flow process of the present invention for production and delivery of a fluid mixture to a localized volume. In a first location 100, a first mixture 120 is produced. Generally first location 100 is land based and represents a manufacturing plant of some sort. First mixture 120 comprises a mixture of a solvent 110, monomer 112, and inhibitor 114. Solvent 110 may comprise any liquid composition in which monomer 112 and inhibitor 114 are able to dissolve, for forming first mixture 120. Solvent 110 may be an aqueous solvent or an organic solvent. It may also contain a number of chemical additives or surfactants. Preferably, first mixture 120 contains enough solvent 110 to fully dissolve or disperse both monomer 112 and inhibitor 114. Monomer 112 may comprise any single monomer or a combination of multiple monomers, permitted that once emulsified in first mixture 120, first mixture 120 will decrease in specific volume under increased temperatures, assuming inhibitor 114 is not yet present. In certain embodiments, monomer 112 comprises one or more acrylates and methacrylates. Both acrylates and methacrylates easily form polymers as the double bonds found in their vinyl groups, two carbon atoms double bonded to each other and attached to a carbonyl carbon atom, are very reactive. In some instances, monomer 112 includes pure methyl methacrylate (MMA) such that when emulsified within mixture 120, it preferably has a droplet size ranging between 10 and 200 Microns. Inhibitor 114 stabilizes fluid mixture 120 and prevents monomer 112 from premature polymerization. As the temperature of fluid mixture 120 increases, inhibitor 114 scavenges free radicals, formed from decomposing peroxides, which may otherwise react with the double bonds found in the vinyl groups of monomer 112. The concentration of inhibitor 114 is dependent on the inherent instability of monomer 112, the pressure and thermal conditions that the fluid mixture 120 is expected to be exposed to, and the timeframe in which the fluid mixture 120 is set to be encapsulated. Inhibitor 114 can be comprised of any solution that will prevent premature polymerization of monomer 112.

The specific composition of first mixture 120 is dependent on the characteristics of localized volume 130 to which the first mixture 120 is being prepared for. In general, the first mixture 120 will contain sufficient monomer 112, such that an increased temperature of the first mixture 120 generates a decreased specific volume of the first mixture 120 assuming inhibitor 114 is not present. It is to be understood that when the first mixture 120 is subjected to increased temperatures, as little as a 25° F. rise, from the ambient conditions in the first location 100, a decrease in specific volume of the first mixture 120 may occur assuming inhibitor 114 is not present. The quantity of monomer 112 needed to be considered sufficient, depends on the desired reduction in specific volume of first mixture 120, which may be determined by a number of factors. In one embodiment, the localized volume 130 is an annular volume within a wellbore and the desired reduction in specific volume of first mixture 120 is determined by well specific factors, such as well depth and location, the casing string assembly load limitations, localized temperatures and pressures within the well system during drilling and completions, and temperatures and pressures expected within the well system during production. Generally, it is desired that first mixture 120 includes sufficient monomer such that a decrease in specific volume of the first mixture 120 corresponds directly to an expected pressure increase of annular volume if an incompressible fluid were present.

Once first mixture 120 is formulated it is transported from first location 100 to second location 102. Generally first location 100 is remote from second location 102. Second location 102 may be land-based or aquatic-based and generally is nearby and has access to localized volume 130. If the second location 102 is land-based the first mixture 120 may be shipped via one or more of truck, railway, and air transport from first location 100. If second location 102 is aquatic-based, first mixture may be shipped via one or more of truck, railway, and air transport to a marine port where it is then transported the remaining distance to location 102 via ship.

At second location 102, initiator 118 is optionally combined with first mixture 120 to produce second mixture 122. Initiator 118 is a chemical compound that initiates a chemical chain reaction within first mixture 120. Initiator 118 counteracts inhibitor 114 such that when second mixture 122 is exposed to elevated temperatures, second mixture 122 may decrease in specific volume due to the presence of monomer 112. The quantity of initiator 118 added to first mixture 120 to produce mixture 122 is dependent on characteristics of localized volume 130 and on the composition of first mixture 120. Generally sufficient initiator 118 is added during production of mixture 122 to nullify the influence of inhibitor 114, therefore allowing second mixture 122 to decrease in specific volume due to the presence of monomer 112 when exposed to elevated temperatures. In some instances, enough initiator 118 is added such that it not only nullifies the influence of inhibitor 114, but also promotes and sustains an acceptable polymerization rate of monomer 112 within second mixture 122. In certain embodiments, initiator 118 is considered a free radical initiator such that it provides sufficient free radicals to mixture 122 needed to completely react inhibitor 114. Additionally initiator 118 may contain the initial free radical required for propagating polymerization of monomer 112. In certain embodiments, initiator 118 is selected from one or more of a group consisting of azo-compounds, organic peroxides, and inorganic peroxides.

According to the present invention, second mixture 122 is delivered to localized volume 130. Delivery of the second mixture may generally occur according to any manner known in the art. For example, wherein the localized volume 130 comprises an annular volume within a wellbore as shown in FIG. 1, delivery of second mixture 122 typically occurs in accordance with two generally used methods: (1) second mixture 122 may be introduced to wellbore volume 16 through wellbore opening 54 and pumped downward until reaching wellbore terminus 14, at which point it passes through gap 18 below casing string end 36 of casing string 28 into the annular volume 50. (2) second mixture 122 is pumped down directly from the top of annular volume 50 through opening 52 defined by the exterior of casing string 28 and the interior of casing string 26. The amount of second mixture 122 delivered to localized volume 130 may also vary depending on its composition and the characteristics of localized volume 130. Again, wherein the localized volume 130 comprises an annular volume within a wellbore, the following factors may be used in determining the quantity of second mixture 122 delivered to the annular volume: well depth and location, the casing string assembly load limitations, localized temperatures and pressures within the well system during drilling and completions, and temperatures and pressures expected within the well system during production. For instance, second mixture 122 may be prepared knowing what would have been the expected pressure increase within the annular volume if an incompressible fluid were present and therefore, is mixed such that when encapsulated, the expected decrease in specific volume of the second mixture 122 generally produces an isobaric environment within the annular volume regardless of being subject to elevated temperatures.

Figure 4:
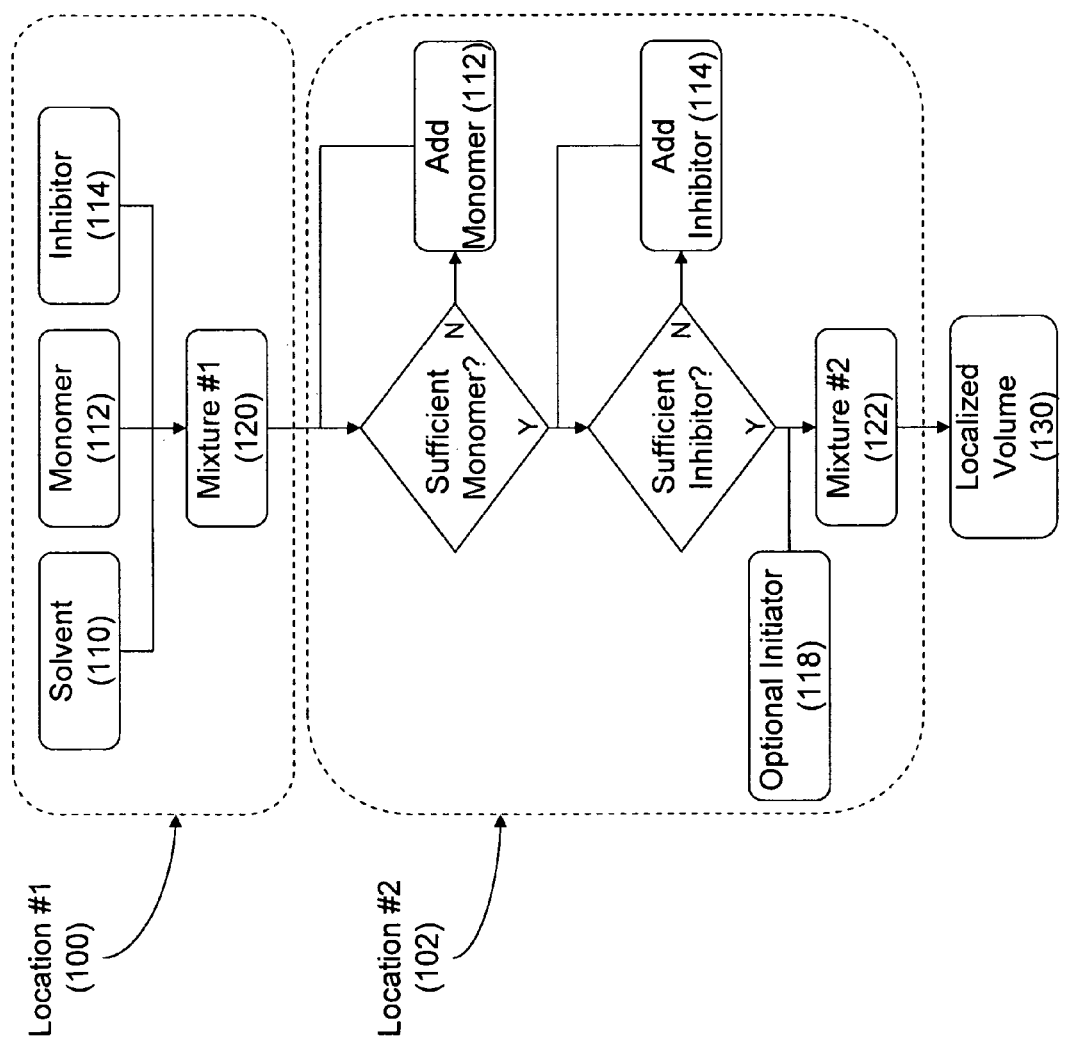
FIG. 4 illustrates a flow process of the present invention for production and delivery of a fluid mixture to a localized volume while ensuring sufficient monomer and inhibitor are contained in the fluid mixture.

FIG. 4 illustrates a flow process of the present invention for production and delivery of a second mixture 122 to localized volume 130 while ensuring sufficient monomer 112 and inhibitor 114 are contained within the second mixture 122 prior to delivery. Similar to FIG. 3, first mixture 120 is prepared from solvent 110, monomer 112, and inhibitor 114 at first location 100 and is then transferred to second location 102. At second location 102, first mixture 120 is analyzed to determine whether it contains a sufficient amount of monomer 112 and a sufficient amount of inhibitor 114. Analysis can be performed using any suitable analytical method to determine the concentration of monomer 112 and/or inhibitor 114 within the first mixture 120." See, for instance, "Method of Analysis of Polymerizable Monomeric Species in a Complex Mixture", USPTO application Ser. No. 11/998,331, filed Nov. 28, 2007.

If first mixture 120 is found to be lacking sufficient monomer 112, additional monomer 112 is added at second location 102 and first mixture 120 may be reanalyzed if desired for assurance of sufficient monomer 112. Similarly, if first mixture 120 is found to be lacking sufficient inhibitor 114, additional inhibitor 114 is added at second location 102 and first mixture 120 may be reanalyzed if desired for assurance of sufficient inhibitor 114. First mixture 120, with sufficient amounts of monomer 112 and inhibitor 114, is then optionally mixed with initiator 118 to form second mixture 122, at which point second mixture 122 is delivered to localized volume 130. Alternatively, initiator 118 may be added to first mixture 120 upon arrival to second location 102, thus forming second mixture 122, and second mixture 122 could be analyzed to ensure sufficient quantities of monomer 112 and inhibitor 114 instead of first mixture 120. Similarly, additional monomer 112 or inhibitor 114 may be added to second mixture 122 to ensure sufficient quantities prior to delivery of second mixture 122 to localized volume 130.

Figure 5:
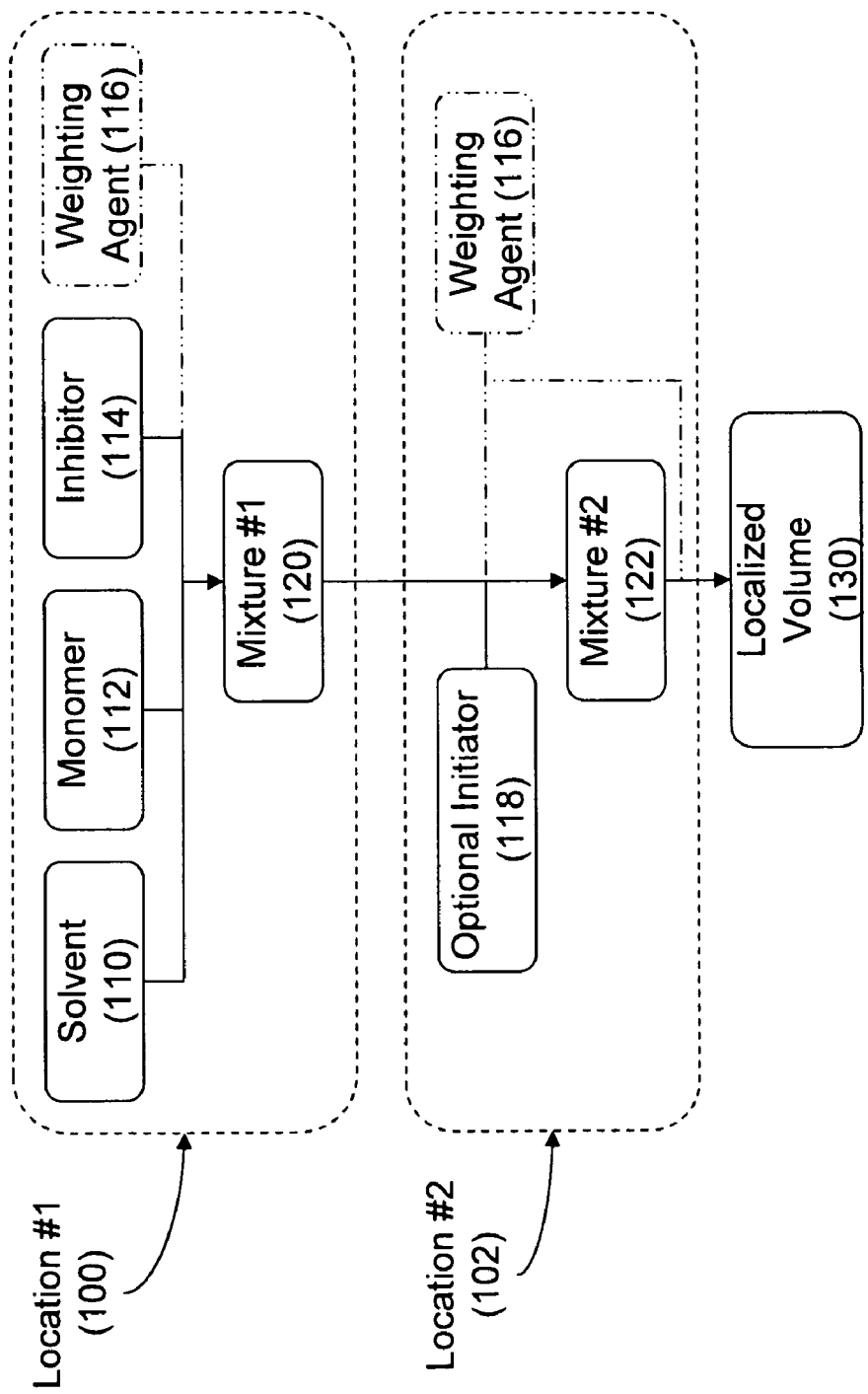
FIG. 5 illustrates a flow process of the present invention for production and delivery of a fluid mixture including a weighting agent to a localized volume.

FIG. 5 illustrates a flow process of the present invention for production and delivery of second mixture 122 including a weighting agent 116 to localized volume 130. Similar to FIG. 3, first mixture 120 is prepared utilizing solvent 110, monomer 112, and inhibitor 114 at first location 100 and is then transferred to second location 102, where it is the optionally mixed with initiator 118 to form second mixture 122, at which point second mixture 122 is delivered to localized volume 130. However, in this process weighting agent 116 is added to either the first mixture and/or the second mixture 122 prior to delivery to localized volume 130. As shown in FIG. 5 by a segmented dashed and dotted line, weighting agent 116 may be added to first mixture 120 at either first location 100 or at second location 102. Likewise, weighting agent 116 may be added to second mixture 122 just prior to delivery of second mixture 122 to localized volume 130. It shall be understood that weighting agent need not be added at all these mentioned locations and instead may be added at one or a combination of these locations such that prior to delivery to localized volume 130 a concentration of weighting agent is present within second mixture 122. Weighting agent 116 typically is composed of finely ground solid material offering a high specific gravity (generally about 3 to 5 grams per cubic centimeter), but may be any solute that increases the density of first mixture 120 or second mixture 122. Weighting agent 116 is often needed, especially when the localized volume 130 is at extreme depths below the surface. For instance, in a deep water well, use of weighting agent 116 becomes increasingly important as the pressure increases within the wellbore with deeper depths. In some instances, barite, which is a mineral that consists of barium sulfate, is used as a weighting agent 116. Other examples of weighting agents 116 that may be solely used or used in combination include brines, hematite, calcium carbonate, siderite, and ilmenite.

Figure 6:
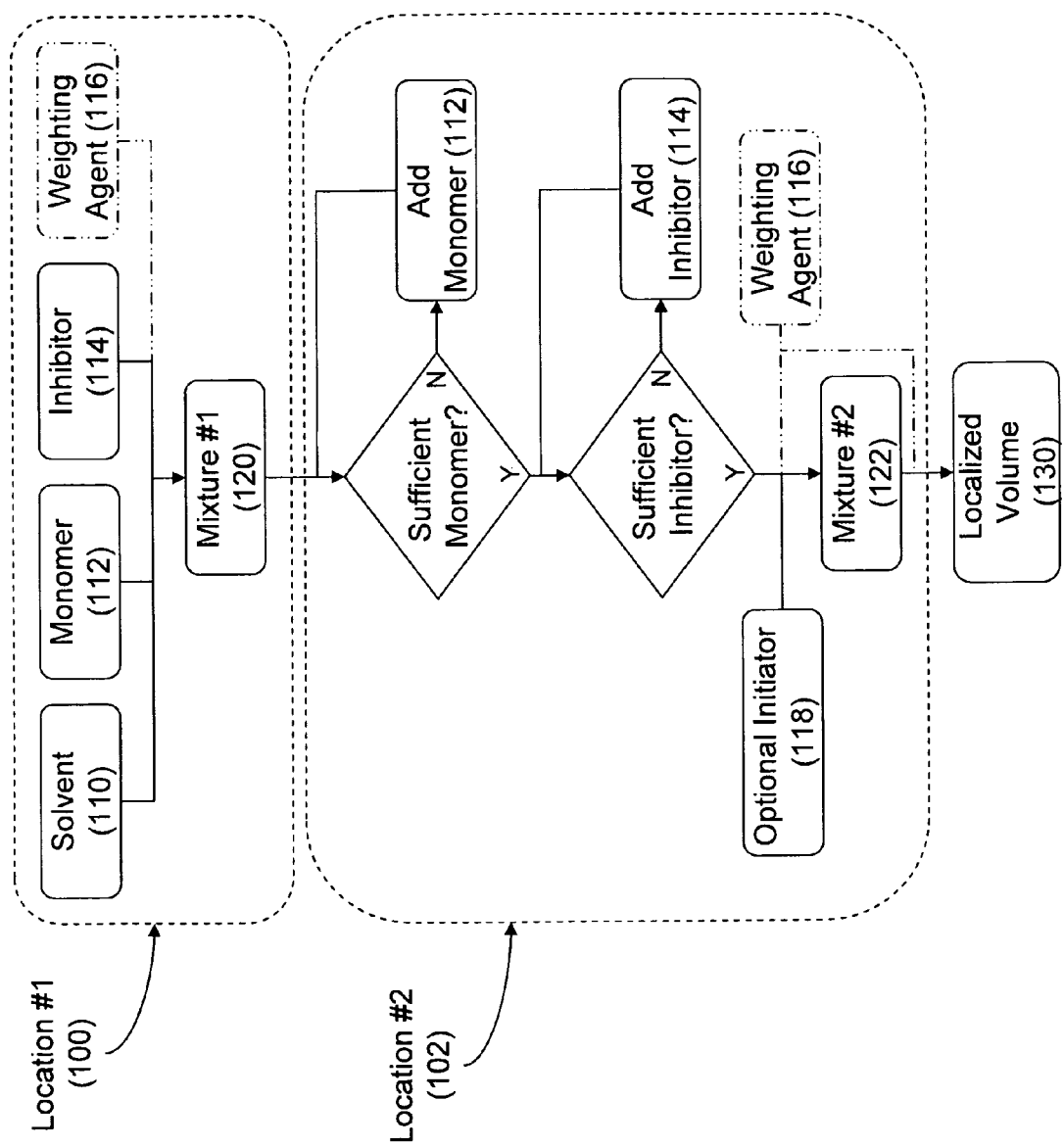
FIG. 6 illustrates a flow process of the present invention combining the flow processes of FIGS. 4 and 5.

FIG. 6 illustrates a flow process of the present invention combining the flow processes of FIGS. 4 and 5. First mixture 120 is prepared utilizing solvent 110, monomer 112, and inhibitor 114, and possibly weighting agent 116 at first location 100 and is then transferred to second location 102. At second location 102, first mixture 120 is analyzed to ensure sufficient amounts of monomer 112 and inhibitor 114. Monomer 112 and/or inhibitor 114 is added as needed to ensure sufficient quantities of each. First mixture 120 is then optionally mixed with initiator 118 and possibly weighting agent 116 to form second mixture 122, at which point second mixture 122, possibly mixed with weighting agent 116, is delivered to localized volume 130.

While the present invention has been shown in only some of its forms, those skilled in the art will appreciate that the above described embodiments are merely illustrative of the present invention and that many variations of the foregoing described embodiments can be devised without departing from the spirit and scope of the invention. For instance, solvent 110 and inhibitor 114 could be mixed at a first location and monomer 112 could later be mixed in another subsequent location to form first mixture 120. It is therefore intended that such departures from the present disclosure, that come within the known customary practice in the art to which this invention pertains, be included within the scope of the following appended claims and their equivalents.

Although the method and process described herein has been described in connection with preferred embodiments thereof, it will be appreciated by those skilled in the art that additions, deletions, modifications, and substitutions not specifically described may be made without departing from the spirit and scope of the method and process as defined in the appended claims.

That which is claimed is:

1. A process for delivering a mixture to a confined volume comprising:
    (a) forming a mixture of at least one polymerizable monomer and at least one inhibitor in a fluid;
    (b) transporting the mixture to a second location;
    (c) delivering at least a portion of the mixture to a localized volume at the second location; and
    (d) sealing the localized volume to produce a confined volume containing at least a portion of the mixture;
    wherein the polymerizable monomer polymerizes within the confined volume with a decrease in pressure within the confined volume and
    the polymerizable monomer and the inhibitor are present in the mixture in an amount determined from the following: (i) time elapsed between forming the mixture in step (a) and sealing the localized volume in step (d), (ii) a projected temperature conditions during transportation in step (b), and expected pressure change in the confined volume after sealing the mixture within the confined volume.

2. The process according to claim 1, wherein the confined volume is within a wellbore extending from the mudline to the bottom of the wellbore depth or any annular volume thereof, and is filled with at least a portion of the mixture.

3. The method according to claim 1, further comprising the step of mixing at least one initiator into the mixture prior to delivering the mixture to the localized volume.

4. The method according to claim 3, wherein the at least one initiator is added in an amount determined from the following: (i) time between adding the initiator and beginning polymerization of the polymerizable monomer, (ii) a projected temperature profile of mixture after addition of the initiator, (iii) reaction rate of the initiator with the polymerizable monomer, and (iv) reaction rate of the initiator with the inhibitor.

5. The method according to claim 3, wherein the initiator is present in the mixture in amount between about 0.001 weight percent and about 5 weight percent of the mixture.

6. The method according to claim 3, wherein the inhibitor is oil soluble and the initiator is water soluble.

7. The method according to claim 3, wherein the polymerizable monomers in the mixture do not polymerize for at least 1 hour at the second location after mixing at least one initiator into the mixture and prior to being delivered to the localized volume in step (c).

8. The method according to claim 1, further comprising mixing at least one weighting agent with the mixture prior to step (c) delivering at least a portion of the mixture to a localized volume.

9. The method according to claim 1, wherein the volume is an annular volume described by two concentric casing strings within a well bore.

10. The method according to claim 1, wherein the polymerizable monomer is selected from the group consisting of acrylates, methylacrylates, styrenics, N-vinyl amides, acrylamides, methacrylamides, and vinyl urethanes.

11. The method according to claim 1, wherein the polymerizable monomer is present in the mixture in an amount between about 0.5 weight percent and about 50 weight percent of the mixture and the inhibitor is present in the mixture in an amount between about 1 and about 10,000 ppm.

12. The method according to claim 1, wherein the inhibitor is selected from the group consisting of hydroquinone; hydroquinone monomethyl ether; phenothiazine and derivatives thereof 2,2,6,6-tetramethylpiperidin-1-oxyl free radical; 4-hydroxy-2,2,6,6-tetramethylpiperidin-1-oxyl free radical and derivatives thereof; N-nitrosophenylhydroxylamine ammonium or aluminum salts; N,N-diethylhydroxylamine, and mixtures thereof.

13. The method according to claim 1, wherein the mixture contains droplets comprising the polymerizable monomer, wherein the droplets have a diameter between about 10 and about 200 μm.

14. The method according to claim 1, wherein the polymerizable monomers in the mixture do not polymerize for at least 1 hour at the second location prior to being delivered to the localized volume in step (c).

15. The method according to claim 1, wherein the at least one polymerization inhibitor is present in an amount such that the polymerizable monomers in the mixture do not polymerize for at least five weeks prior to being delivered to the localized volume in step (c).

16. A process for controlling pressure buildup within an annular volume located between two casing strings within a wellbore, comprising the steps of:
    (a) forming a mixture of at least one polymerizable monomer and at least one inhibitor;
    (b) transporting the mixture to a second location;
    (c) optionally mixing at least one initiator into the mixture;
    (d) filling at least a portion of the annular volume with the mixture;
    (e) sealing the annular volume; and
    (f) heating the mixture within the sealed annular volume such that the polymerizable monomer polymerizes with a decrease in pressure within the sealed annular volume; wherein the polymerizable monomer and the inhibitor are present in the mixture in an amount determined from the following: (i) time elapsed between forming the mixture in step (a) and sealing the annular volume in step (e), (ii) a projected temperature conditions during transportation in step (b), and expected pressure increase in the annular volume after sealing the mixture within the annular volume.

17. The process according to claim 16, wherein the sealed annular volume within the wellbore extends from the mudline to the bottom of the wellbore depth or any annular volume thereof, and is filled with at least a portion of the mixture.

18. A process for delivering a mixture to an encapsulated volume comprising:
    a) forming a first mixture of at least one polymerizable monomer and at least one inhibitor in a water-based fluid at a first location;
    b) transporting the first mixture to a second location;
    c) adding at least one initiator to the first mixture at the second location to form a second mixture;
    d) adding a second quantity of the polymerizable monomer to at least one of the first mixture and second mixture at the second location prior to step (e);
    e) delivering at least a portion of the second mixture to a localized volume; and
    f) sealing the localized volume to produce an encapsulated volume filled with at least a portion of the second mixture.

19. The process according to claim 18, wherein the encapsulated volume is within a wellbore extending from the mudline to the bottom of the wellbore depth or any annular volume thereof, and is filled with at least a portion of the second mixture.

20. The process according to claim 18, wherein at least a portion of the polymerizable monomer polymerizes within the encapsulated volume.

21. The process according to claim 18, further comprising mixing a weighting agent with at least one of the first mixture and second mixture prior to step (d).

22. The process according to claim 18, further comprising adding a second quantity of the inhibitor to at least one of the first mixture and second mixture at the second location prior to step (e).

23. A process for delivering a mixture to an annular volume within a well-bore comprising:
    a) forming a mixture of at least one monomer and at least one inhibitor in a water-based fluid at a first location;
    b) transporting the mixture to a second location;
    c) optionally adding at least one initiator to the mixture at the second location;
    d) adding a second quantity of the monomer to the mixture at the second location prior to step (e);
    e) delivering at least a portion of the mixture to an annular volume located between two concentric casing strings within a well-bore; and
    f) sealing the annular volume to produce an encapsulated volume filled with at least a portion of the mixture.

24. The process according to claim 23, further comprising mixing a weighting agent with the mixture prior to step (d), wherein the weighting agent is selected from the group consisting of brines, barite, hematite, calcium carbonate, siderite, ilmenite, and mixtures thereof.

25. The process according to claim 23, further comprising adding a second quantity of the inhibitor to the mixture at the second location prior to step (e).

26. The process according to claim 23, wherein the encapsulated volume within the wellbore extends from the mudline to the bottom of the wellbore depth or any annular volume thereof, and is filled with at least a portion of the mixture.

27. The process according to claim 23, wherein the monomer polymerizes within the encapsulated volume with a decrease in pressure within the encapsulated volume.

* * * * *